(12) United States Patent
Schenk et al.

(10) Patent No.: US 8,347,850 B2
(45) Date of Patent: Jan. 8, 2013

(54) INTERNAL-COMBUSTION ENGINE AND HOMOGENEOUS CHARGE COMPRESSION IGNITION PROCESS

(75) Inventors: Martin Schenk, Rosenheim (DE); Michael Guenthner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/156,072

(22) Filed: Jun. 8, 2011

(65) Prior Publication Data

US 2011/0232602 A1    Sep. 29, 2011

Related U.S. Application Data

(63) Continuation of application No. PCT/EP2009/008339, filed on Nov. 24, 2009.

(30) Foreign Application Priority Data

Dec. 11, 2008  (DE) .......................... 10 2008 061 769

(51) Int. Cl.
*F02P 23/00* (2006.01)

(52) U.S. Cl. ..................................... 123/295; 123/143 B

(58) Field of Classification Search .............. 123/143 B, 123/294, 295
See application file for complete search history.

(56) References Cited

U.S. PATENT DOCUMENTS

| | | | |
|---|---|---|---|
| 4,124,003 A | 11/1978 | Abe et al. | |
| 6,619,254 B2 | 9/2003 | Chmela et al. | |
| 6,662,760 B1 * | 12/2003 | Stanglmaier et al. | 123/3 |
| 6,986,342 B2 | 1/2006 | Thomas | |
| 2002/0059907 A1 | 5/2002 | Thomas | |
| 2004/0129241 A1 | 7/2004 | Freen | |
| 2006/0037567 A1 * | 2/2006 | Thomas | 123/56.7 |
| 2007/0266979 A1 | 11/2007 | Nagamine et al. | |
| 2009/0133666 A1 * | 5/2009 | Thomas | 123/25 C |
| 2010/0212631 A1 | 8/2010 | Makarov et al. | |

FOREIGN PATENT DOCUMENTS

| | | |
|---|---|---|
| DE | 27 13 217 A1 | 10/1978 |
| DE | 101 47 529 A1 | 6/2002 |
| GB | 1 600 076 | 10/1981 |
| WO | WO 2009/016310 A2 | 2/2009 |

OTHER PUBLICATIONS

International Search Report dated Feb. 25, 2010 with English translation (six (6) pages).
German Search Report dated Dec. 1, 2009 with partial English translation (nine (9) pages).

\* cited by examiner

*Primary Examiner* — Erick Solis
(74) *Attorney, Agent, or Firm* — Crowell & Moring LLP

(57) ABSTRACT

An internal-combustion engine can be operated in a homogeneous charge compression ignition mode at least under certain operating conditions. The combustion mixture present in the combustion chamber reaches auto-ignition conditions and ignites itself. The internal-combustion engine includes a triggering unit for triggering the auto-ignition during the homogeneous charge compression ignition mode before the auto-ignition conditions have been reached. The triggering unit is constructed as a corona ignition system and can be operated for triggering the auto-ignition during the homogeneous charge compression ignition mode, particularly by generating a non-thermal plasma.

19 Claims, 1 Drawing Sheet

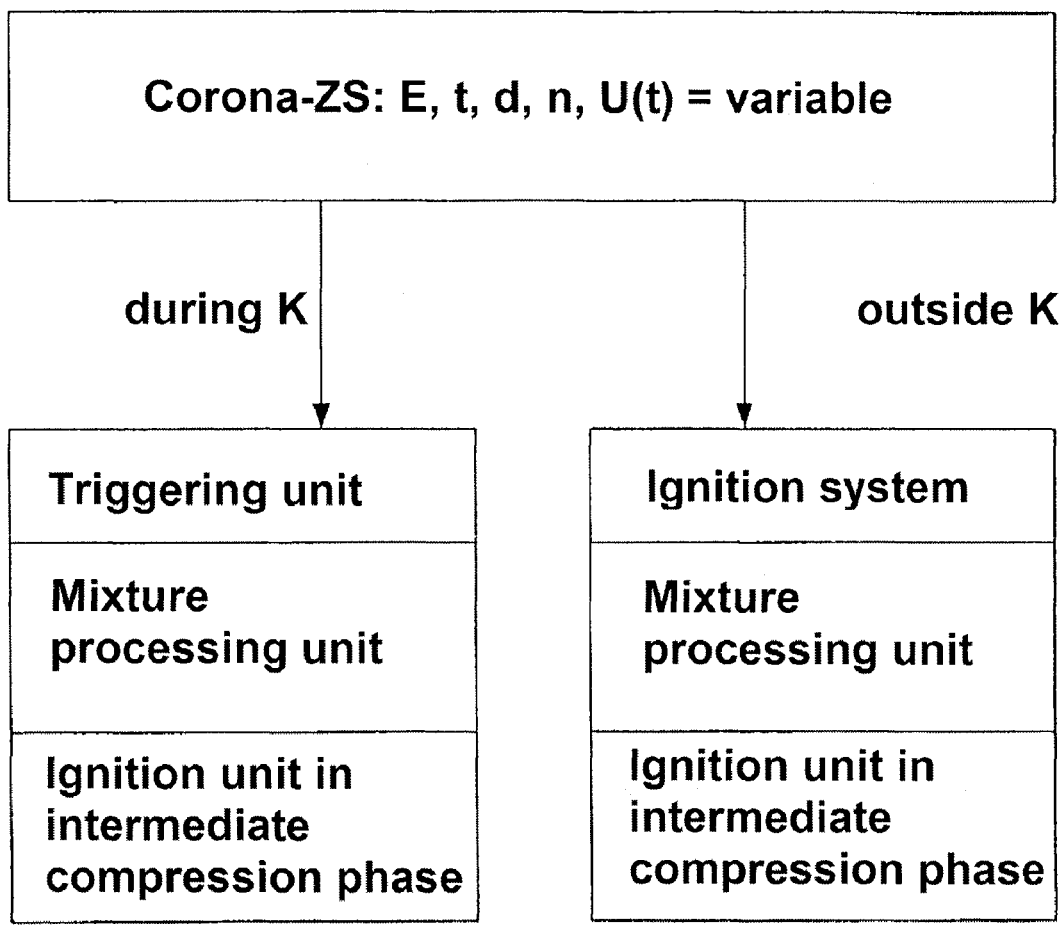

US 8,347,850 B2

INTERNAL-COMBUSTION ENGINE AND HOMOGENEOUS CHARGE COMPRESSION IGNITION PROCESS

CROSS-REFERENCE TO RELATED APPLICATIONS

This application is a continuation of PCT International Application No. PCT/EP2009/008339, filed Nov. 24, 2009, which claims priority under 35 U.S.C. §119 from German Patent Application No. DE 10 2008 061 769.5, filed Dec. 11, 2008, the entire disclosures of which are herein expressly incorporated by reference.

BACKGROUND AND SUMMARY OF THE INVENTION

The invention relates to an internal-combustion engine, particularly to an Otto engine, which can be operated in a homogeneous charge compression ignition mode at least under certain operating conditions, as well as to a process for controlling a correspondingly constructed internal-combustion engine.

Currently, many efforts are being made to reduce fuel consumption at partial load on an engine while simultaneously maintaining extremely low pollutant emissions. In this case, unthrottled Otto-engine-type stratified combustion processes exhibit great potential for reducing consumption. In the stratified combustion process or the lean operation, fuel injection into the cylinder is not carried out until just before the ignition point-in-time so that, at the point-in-time of the ignition, despite a very low quantity of injected fuel, an ignitable combustion mixture forms around the spark plug. The flame front generated by means of the spark plug spreads from there into the entire combustion chamber. The conversion speed therefore depends on the flame speed. However, the problem of these stratified lean concepts is that a high-expenditure exhaust gas aftertreatment is necessary for reducing nitrogen oxides.

The above-mentioned problem can be avoided by a so-called homogeneous charge compression ignition process—also called HCCI—which can be used under certain operating conditions of the internal-combustion engine. In the case of the HCCI process, in the homogeneous charge compression ignition mode of the internal-combustion engine, the ignition does not—as in conventional processes—take place at the spark plug in a punctiform manner but rather in the entire combustion chamber almost simultaneously by auto-ignition of the combustion mixture because, during the compression (or in the course of the process), the cylinder charge reaches auto-ignition conditions and thereby auto-ignites. The combustion is therefore not initiated by a punctiform external ignition source but is determined only by the ignition conditions in the combustion chamber. The conditions required for this purpose are ensured, for example, by the return of hot residual gas, by a preheating of the intake air or by an increase of compression. On the one hand, this combustion process has a high potential for reduced fuel consumption and, on the other hand, the NOx crude emission is lowered so far in large operating ranges that a lean operation becomes possible also without a high-expenditure exhaust gas aftertreatment.

However, in the case of the above-mentioned combustion processes, it is problematic that the combustion in the homogeneous charge compression ignition mode, in contrast to the external ignition, where the ignition point-in-time functions as a dominant control parameter, cannot be controlled by means of a singularly applicative parameter. Because of the relatively slowly expanding combustion front in the case of an ignition of the combustion mixture by means of a conventional spark plug, the course of the HCCI combustion process can only be marginally influenced by such ignition systems; i.e. such ignition systems are not suitable for controlling the course of the combustion in the entire operating range of this combustion process.

An arrangement and a method for controlling a homogeneous charge compression ignition process is known from U.S. Pat. No. 6,986,342 B2, where by means of a corona discharge device, which may be arranged either in the intake port of the cylinder or the combustion chamber of the cylinder, an ionization of the combustion mixture can be carried out. The point-in-time of the combustion can be influenced by the degree of ionization. Furthermore, a triggering unit is disclosed which permits a triggering of the auto-ignition.

It is an object of the invention to provide an internal-combustion engine and a corresponding process by which a controlled and rapid ignition can be achieved in the homogeneous charge compression ignition mode.

This and other objects are achieved by an internal-combustion engine, particularly a direct injection (Otto) internal-combustion engine, possibly having a supercharging device, which can be operated in a homogenous charge compression ignition mode at least under certain operating conditions. In this case, as described above, the combustion mixture present or formed in the combustion chamber reaches auto-ignition conditions as a result of the compression as well as the occurring chemical processes, so that the chemical conversion starts either isochronously or typically in fast succession in the entire combustion chamber.

In order to be able to actively ignite the combustion mixture outside the homogeneous charge compression ignition mode, an ignition system has to be provided in the case of Otto internal-combustion engines, which ignition system triggers the conversion of the combustion mixture as a function of the desired point-in-time of the ignition. According to the prior art, conventional spark plugs are used for this purpose, which generate a spark that ignites the combustion mixture in the immediate surroundings of the spark. As a function of the speed of the flame front propagation, the combustion mixture is successively ignited in the entire combustion chamber.

The invention recognizes that, in addition to conventional spark plug ignitions systems, so-called corona ignition systems are known. In the case of corona ignition systems, a very high voltage in connection with a very inhomogeneous electric field distribution is generated at an electrode tip in the combustion chamber, for example, by way of a Tesla coil, which is resonated by way of a high-frequency alternating voltage. As a result, the electric field locally becomes sufficiently high in order to generate an incomplete spark breakthrough (corona) in the combustion chamber, in which electrons are pulled or pushed out of the atom or molecule cores. No complete conductive ion conduit from the high-frequency/high-voltage electrode to the mass is thereby generated. Depending on the frequency of the excitation, only a slight heating of the generated so-called non-thermal corona plasma takes place. Radicals are formed by which a chemical chain reaction is started in the combustion chamber.

In order to achieve a controlled ignition in the homogeneous charge compression ignition mode in the case of internal-combustion engines that can be operated in a homogeneous charge compression ignition mode at least under certain operating conditions, a corona ignition system is used as a triggering unit for triggering or activating this auto-ignition before the auto-ignition conditions are reached. As a result of the generated corona discharge, an initialization of the spatial auto-ignition takes place, which initialization is targeted with respect to time, in that radicals form along the corona threads, whereby the reactivity of the combustion mixture is increased locally. A very fast ignition is thereby initialized along the corona threads, and thus the auto-ignition (for example, by a pressure-induced temperature increase and radical chain explosion) is triggered in the residual areas of the combustion chamber.

In order to save unnecessary costs and space, this corona ignition system, especially in the case of Otto internal-combustion engines, according to the invention, can be further developed and arranged such that it can also be used for the (external) ignition of the combustion mixture especially by generating a so-called non-thermal plasma outside the homogeneous charge compression ignition mode. In this case, a conventional ignition system (spark plug system) for the active external ignition of the combustion mixture outside the homogeneous charge compression ignition can be eliminated.

Analogous to the internal-combustion engine according to the invention, the process according to the invention for controlling an internal-combustion engine during a homogeneous charge compression ignition mode (as described above), in the case of which the auto-ignition can be triggered, before the auto-ignition conditions have been reached, by means of a triggering unit, is characterized in that the triggering unit is constructed as a corona ignition system. The corona ignition system triggers or activates the auto-ignition during the homogeneous charge compression ignition mode, particularly by generating a so-called non-thermal plasma.

In the case of the current state of the art, in the homogeneous charge compression ignition mode, the point-in-time of the auto-ignition is, as a rule, set by the targeted control of the course of the process (for example, variation of the mixture temperature and injection point-in-time, etc.). However, because of varying marginal conditions of the course of the process, this point-in-time cannot be set in a precise manner. As a result, in the case of the application of the corona ignition system according to the invention, the combustion mixture is transformed only into a condition shortly before the auto-ignition threshold, so that, by means of a triggering by the corona ignition system (particularly by generating a corona discharge), the combustion can be initiated at a precise point-in-time.

The corona discharge for activating the auto-ignition in the homogeneous charge compression ignition mode at the precise point-in-time can, in this case, be generated as a function of the desired optimal point-in-time of the ignition. For a controlled course of the combustion, the ignition voltage, the point-in-time of the ignition, and/or the duration of the ignition of the corona ignition system can be predefined in a variable manner for triggering or for activating the auto-ignition in the homogeneous charge compression ignition mode, and the ignition voltage can be modulated during the corona discharge. Thus, for example, as required, a targeted retard of the start of the conversion into the expansion cycle can be caused.

The corona ignition system may advantageously also be ignitable several times within one working cycle, so that, for the initiation or control of the conversion, as required, a targeted multiple ignition can be carried out.

In a further advantageous development of the internal-combustion engine according to the invention and of the process according to the invention, the corona ignition system can additionally be operated as an ignition system for igniting the combustion mixture outside the homogeneous charge compression ignition mode and/or as a mixture processing unit for the radical-chemical processing of the combustion mixture and/or as an ignition unit for igniting the combustion mixture present in the combustion chamber during an intermediate compression phase. The operative range for a radical-chemical processing may, for example, be from the "exhaust closes" point-in-time of the preceding cycle to the (auto)-ignition point-in-time of the current cycle. An operation of the corona ignition system as an ignition unit for igniting the combustion mixture present in the combustion chamber during an intermediate compression phase could take place, for example, during the time period when a negative valve overlap is present. This time period is between "exhaust closes" and "intake opens". Thus, for expanding the operating range of the spatial auto-ignition, fuel can be injected into the residual gas (with residual oxygen) during this time period and the mixture can subsequently be ignited by the corona discharge.

The process according to the invention as well as its advantageous embodiments can be implemented by means of an algorithm or a corresponding module arrangement in a control device provided for that purpose, particularly in an engine control unit.

Other objects, advantages and novel features of the present invention will become apparent from the following detailed description of one or more preferred embodiments when considered in conjunction with the accompanying drawing.

BRIEF DESCRIPTION OF THE DRAWING

The single figure illustrates the different ranges of application of a corona ignition system in the case of an internal-combustion engine which can be operated under certain operating conditions in a so-called homogeneous charge compression ignition mode within the scope of a so-called HCCI combustion process.

DETAILED DESCRIPTION OF THE DRAWING

In the case of the HCCI combustion process, during the homogeneous charge compression ignition mode of the internal-combustion engine, the ignition does not—as in conventional processes—take place at the spark plug in a punctiform manner, but rather in the entire combustion chamber almost simultaneously by an auto-ignition of the combustion mixture. The combustion is therefore not initiated by a locally limited ignition source (for example, a spark plug) but is determined only by the ignition conditions in the combustion chamber. The ignition conditions required for this purpose are ensured, for example, by the return of hot residual gas. Outside the homogeneous charge compression ignition mode, the combustion mixture is not ignited by auto-ignition, but by an active (external) igniting by means of an ignition system.

According to an exemplary embodiment of the invention, the internal-combustion engine is equipped with a corona ignition system (Corona-ZS), which is positioned, for example, in the combustion chamber of at least one cylinder at the point where, in the case of conventional internal-combustion engines, the spark plug is positioned. The corona ignition system (Corona ZS) can be used in different fashions or for different tasks within the scope of the combustion process. In the case of the corona ignition system (Corona ZS), the ignition energy E as well as the ignition point-in-time t can be defined to be variable at least in the homogeneous charge compression ignition mode. The ignition duration d, the ignition frequency n and an optimized corona ignition voltage course U(t) can also be predefined (for example, at least within a single ignition operation).

As long as, because of the existing operating conditions, the internal-combustion engine is outside the homogeneous charge compression ignition mode K, the corona ignition system (Corona ZS) can be used as the ignition system for the active (external) igniting of the combustion mixture by generating a so-called non-thermal plasma. However, if, because of the existing operating conditions, the internal-combustion engine is in an operating state in which a auto-ignition of the combustion mixture seems possible and meaningful, i.e. the internal-combustion engine is in a homogeneous charge compression ignition mode K, the corona ignition system (Corona ZS) can be used as a triggering unit for the auto-ignition. Since an auto-ignition that is controlled in an exact manner with respect to time is very difficult to achieve without additional resources, the corona ignition system (Corona ZS) can be used as a triggering unit for triggering or activating the auto-ignition. As a result, the actual ignition point-in-time can be precisely coordinated with the desired optimal ignition point-in-time. In order to permit an activating of the auto-ignition by way of the corona ignition system (Corona ZS), the combustion mixture first has to be brought to a state close to but below the auto-ignition threshold, so that an initialization of the auto-ignition can be achieved.

In addition, the corona ignition system (Corona ZS) can be used as a mixture processing unit in one, or in both, operating modes for the radical-chemical processing of the cylinder charge. This ideally takes place within the time window between the "exhaust closes" point-in-time of the preceding cycle and the ignition point-in-time or auto-ignition point-in-time in the current cycle.

Additionally or alternatively, the corona ignition system (Corona ZS) can be used in both operating modes also as an ignition unit for igniting the combustion mixture present in the combustion chamber during an intermediate compression phase. In the intermediate compression phase, about the upper dead center during the charge cycle (also called charge cycle upper dead center) between the "exhaust closes" point-in-time and the "intake opens" point-in-time, the combustion is achieved in that fuel is injected into the residual gas (including residual oxygen) and is subsequently ignited by way of the corona discharge during the intermediate compression.

The internal-combustion engine, according to the invention, as well as the process according to the invention, therefore permit auto-ignition that is controlled in an exact manner with respect to time by use of a corona ignition system. This results in the potential of decreasing the demands on the combustion chamber monitoring system because, under certain circumstances, a pressure sensor required in the combustion chamber for determining and setting the exact ignition point-in-time can be eliminated. In addition, the course of the current-voltage values of the corona ignition system can be used for diagnosing the combustion situation.

By using the corona ignition system as an ignition unit outside the homogeneous charge compression ignition mode, the costs for a conventional ignition system can be saved. Furthermore, the functional control concept of the combustion process is simplified because the intervention is predefined with respect to the main emphasis by way of the point-in-time, the energy, the duration and the modulation of the corona discharge. Finally, the switch-over operations between the different operating modes can be significantly simplified by the targeted controlling of moments (for example, by way of the targeted adjustment of an earlier or later start of the conversion). A stable engine operation therefore becomes possible during the switch-over operations also under unfavorable marginal conditions (for example, high residual gas rates, lean mixture, etc.).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An internal-combustion engine operable in a homogeneous charge compression ignition mode at least under certain operating conditions, the engine comprising:
   a triggering unit operatively configured to trigger auto-ignition during the homogeneous charge compression ignition mode before a combustion mixture in a combustion chamber of the internal-combustion engine reaches auto-ignition conditions to auto-ignite;
   wherein the triggering unit is a corona ignition system operable for triggering the auto-ignition during the homogeneous charge compression ignition mode by a generated non-thermal plasma, and as a result of a generated corona discharge, an initialization of a spatial auto-ignition, which is targeted with respect to time, occurs, such that radicals form along corona threads of the corona ignition system, which initializes a rapid ignition along the corona threads, and the auto-ignition is thus triggered in remaining regions of the combustion chamber.

2. The internal-combustion engine according to claim 1, further comprising:
   an ignition system operatively configured to ignite the combustion mixture outside of the homogeneous charge compression ignition mode; and
   wherein the corona ignition system is configured as the ignition system for igniting the combustion mixture outside of the homogeneous charge compression ignition mode.

3. The internal-combustion engine according to claim 1, wherein during the homogeneous charge compression ignition mode, the combustion mixture present in the combustion chamber in a condition close to an auto-ignition threshold is caused to auto-ignite by a corona discharge of the corona ignition system.

4. The internal-combustion engine according to claim 1, wherein during the homogeneous charge compression ignition mode, the combustion mixture present in the combustion chamber in a condition close to an auto-ignition threshold is caused to auto-ignite by a corona discharge of the corona ignition system.

5. The internal-combustion engine according to claim 3, wherein the corona discharge is generated as a function of a desired optimal ignition point-in-time.

6. The internal-combustion engine according to claim 4, wherein the corona discharge is generated as a function of a desired optimal ignition point-in-time.

7. The internal-combustion engine according to claim 2, wherein at least one of an ignition energy, an ignition point-in-time, an ignition duration, and a modulation of a voltage course of the corona ignition system is predefined in a variable manner for triggering the auto-ignition during operation of the internal-combustion engine within the homogeneous charge compression ignition mode and/or outside of the homogeneous charge compression ignition mode.

8. The internal-combustion engine according to claim 1, wherein the corona ignition system is ignitable multiple times within one working cycle of the internal-combustion engine.

9. The internal-combustion engine according to claim 1, wherein the corona ignition system is additionally operable as a mixture processing unit for the radical-chemical processing of the combustion mixture.

10. The internal-combustion engine according to claim 1, wherein the corona ignition system is additionally operable as an ignition unit for igniting a mixture present in the combustion chamber during an intermediate compression phase.

11. The internal-combustion engine according to claim 9, wherein the corona ignition system is additionally operable as an ignition unit for igniting a mixture present in the combustion chamber during an intermediate compression phase.

12. A process for controlling an internal-combustion engine during a homogeneous charge compression ignition mode in which a combustion mixture present in a combustion chamber ignites upon reaching auto-ignition conditions, the process comprising the acts of:
   generating a non-thermal plasma via a corona ignition system operating as a triggering unit; and
   triggering the auto-ignition with the generated non-thermal plasma during the homogeneous charge compression ignition mode, before the auto-ignition conditions have been reached,
   wherein, as a result of a generated corona discharge, an initialization of a spatial auto-ignition, which is targeted with respect to time, occurs, such that radicals form along corona threads of the corona ignition system, which initializes a rapid ignition along the corona threads, and the auto-ignition is thus triggered in remaining regions of the combustion chamber.

13. The process according to claim 12, wherein the triggering act further comprises the acts of:
   bringing the combustion mixture present in the combustion chamber into a condition close to an auto-ignition threshold; and
   subsequently triggering the auto-ignition via the corona discharge generated by the corona ignition system.

14. The process according to claim 13, wherein the corona discharge for triggering the auto-ignition in the homogeneous charge compression ignition mode is generated as a function of a desired optimal ignition point-in-time.

15. The process according to claim 12, further comprising the acts of:
   predefining in a variable manner at least one of an ignition energy, an ignition point-in-time, an ignition duration, and a modulation of a voltage course of the corona ignition system; and
   auto-igniting the combustion mixture in the homogeneous charge compression ignition mode based upon the predefined characteristic.

16. The process according to claim 12, wherein several corona discharges are initiated within one working cycle.

17. The process according to claim 12, further comprising the act of:
   additionally operating the corona ignition system as at least one of an ignition system for igniting the combustion mixture outside the homogeneous charge compression ignition mode and a mixture processing unit for radical-chemical processing of the combustion mixture.

18. The process according to claim 12, wherein the corona ignition system is additionally operated as an ignition unit for igniting a mixture present in the combustion chamber during an intermediate compression phase.

19. The process according to claim 17, wherein the corona ignition system is additionally operated as an ignition unit for igniting a mixture present in the combustion chamber during an intermediate compression phase.

* * * * *